United States Patent [19]

Bamberger et al.

[11] 4,169,884
[45] Oct. 2, 1979

[54] HYDROGEN PRODUCTION FROM WATER USING COPPER AND BARIUM HYDROXIDE

[75] Inventors: Carlos E. Bamberger, Oak Ridge, Tenn.; Donald M. Richardson, deceased, late of Oak Ridge, Tenn., by Elizabeth B. Richardson, executrix

[73] Assignee: The United States of America as represented by the United States Department of Energy, Washington, D.C.

[21] Appl. No.: 934,664

[22] Filed: Aug. 17, 1978

[51] Int. Cl.² .............................................. C01B 1/02
[52] U.S. Cl. .................................. 423/648 R; 75/109; 75/117; 423/489; 423/593
[58] Field of Search .......................... 75/108, 109, 117; 423/648 R, 593, 604, 636, 489

[56] References Cited

U.S. PATENT DOCUMENTS

| | | | |
|---|---|---|---|
| 1,375,932 | 4/1921 | Rideal et al. | 423/648 R |
| 3,880,987 | 4/1975 | Nahas | 423/648 R |
| 4,005,184 | 1/1977 | Bamberger et al. | |

Primary Examiner—O. R. Vertiz
Assistant Examiner—Wayne A. Langel
Attorney, Agent, or Firm—Dean E. Carlson; Stephen D. Hamel; Allen H. Uzzell

[57] ABSTRACT

A process for producing hydrogen comprises the step of reacting metallic Cu with $Ba(OH)_2$ in the presence of steam to produce hydrogen and $BaCu_2O_2$. The $BaCu_2O_2$ is reacted with $H_2O$ to form $Cu_2O$ and a $Ba(OH)_2$ product for recycle to the initial reaction step. Cu can be obtained from the $Cu_2O$ product by several methods. In one embodiment the $Cu_2O$ is reacted with HF solution to provide $CuF_2$ and Cu. The $CuF_2$ is reacted with $H_2O$ to provide CuO and HF. CuO is decomposed to $Cu_2O$ and $O_2$. The HF, Cu and $Cu_2O$ are recycled. In another embodiment the $Cu_2O$ is reacted with aqueous $H_2SO_4$ solution to provide $CuSO_4$ solution and Cu. The $CuSO_4$ is decomposed to CuO and $SO_3$. The CuO is decomposed to form $Cu_2O$ and $O_2$. The $SO_3$ is dissolved to form $H_2SO_4$. $H_2SO_4$, Cu and $Cu_2O$ are recycled. In another embodiment $Cu_2O$ is decomposed electrolytically to Cu and $O_2$. In another aspect of the invention, Cu is recovered from CuO by the steps of decomposing CuO to $Cu_2O$ and $O_2$, reacting the $Cu_2O$ with aqueous HF solution to produce Cu and $CuF_2$, reacting the $CuF_2$ with $H_2O$ to form CuO and HF, and recycling the CuO and HF to previous reaction steps.

7 Claims, 2 Drawing Figures

HYDROGEN PRODUCTION FROM WATER USING COPPER AND BARIUM HYDROXIDE

Background of the Invention

This invention was made in the course of, or under, a contract with the United States Department of Energy. It relates to the thermochemical production of hydrogen.

For a number of years hydrogen has been produced by the electrolysis of water. Electrolysis is highly inefficient due to the inefficiencies present in electricity production coupled with the efficiency of about 80% for electrolysis. The wide-spread use of hydrogen as a primary energy source will likely depend upon the efficient production of hydrogen by thermochemical processes or by electrolytic processes which have a significantly lower demand for electrical energy than that required by electrolysis of water. Thermochemical techniques involve the decomposition of water into hydrogen and oxygen through a series of chemical reactions not involving the use of fossil fuels. Preferably, the series of reactions not involving the use of fossil fuels. Preferably, the series of reactions is carried out in a closed cyclic manner, such that all products except hydrogen and oxygen are reused as reactants in the other reactions. Typical of such processes are those described in commonly assigned U.S. Nos. 3,490,871 and 4,005,184.

Summary of the Invention

It is an object of this invention to provide a process for producing hydrogen from copper and barium compounds.

It is a further object to provide a closed thermochemical process for producing hydrogen which requires no input other than water and thermal energy.

It is a further object to provide a hybrid process involving both thermochemical and electrolytic steps whereby the consumption of electricity is significantly reduced over that needed for the electrolysis of water. A portion of the process of this invention is also useful for recovering copper form CuO.

These and other objects are achieved according to this invention in a process for producing hydrogen comprising the step of (a) reacting Cu with $Ba(OH)_2$ in the presence of steam to produce hydrogen and $BaCu_2O_2$. The $BaCu_2O_2$ can be reacted with $H_2O$ form $Cu_2O$ and a $Ba(OH)_2$ product which can be recycled to the initial reaction step. Cu can be obtained from the $Cu_2O$ product by several methods. In one embodiment the $Cu_2O$ is reacted with aqueous HF solution to provide $CuF_2$ and Cu. The $CuF_2$ is reacted with $H_2O$ to provide CuO and HF. CuO is decomposed to $Cu_2O$ and $O_2$. The HF and the $Cu_2O$ are recycled and the Cu is recovered as a product. In another embodiment $Cu_2O$ is reacted with aqueous $H_2SO_4$ solution to provide $CuSO_4$ and Cu. The $CuSO_4$ is decomposed to form CuO and $SO_3$. The CuO is decomposed to form $Cu_2O$ and $O_2$. The $SO_3$ is recycled to form $H_2SO_4$ and the $Cu_2O$ is recycled for reaction with $H_2SO_4$. In another embodiment $Cu_2O$ is decomposed electrolytically to Cu and $O_2$. In its copper recovery aspects the process of this invention comprises recovering Cu from CuO by the steps of decomposing CuO to form $Cu_2O$ and $O_2$, reacting the $Cu_2O$ with aqueous HF solution to produce Cu product and $CuF_2$, reacting the $CuF_2$ with $H_2O$ to form CuO and HF, and recycling the CuO and HF to previous reaction steps.

Detailed Description

An aspect of this invention is the discovery of integrated chemical reaction cycles which produce $H_2$ or Cu in high yields without difficult separation steps. The reaction conditions for the individual reactions can be varied somewhat from the specific temperatures, pressures, times, etc. described herein and still provide the desired products. All that is required according to this invention is that the reactants, or material containing the reactants, be reacted to produce the specified products which are then separated and/or recycled to other steps in the process, regardless of the specific conditions under which the reactions are conducted.

Figure 1:
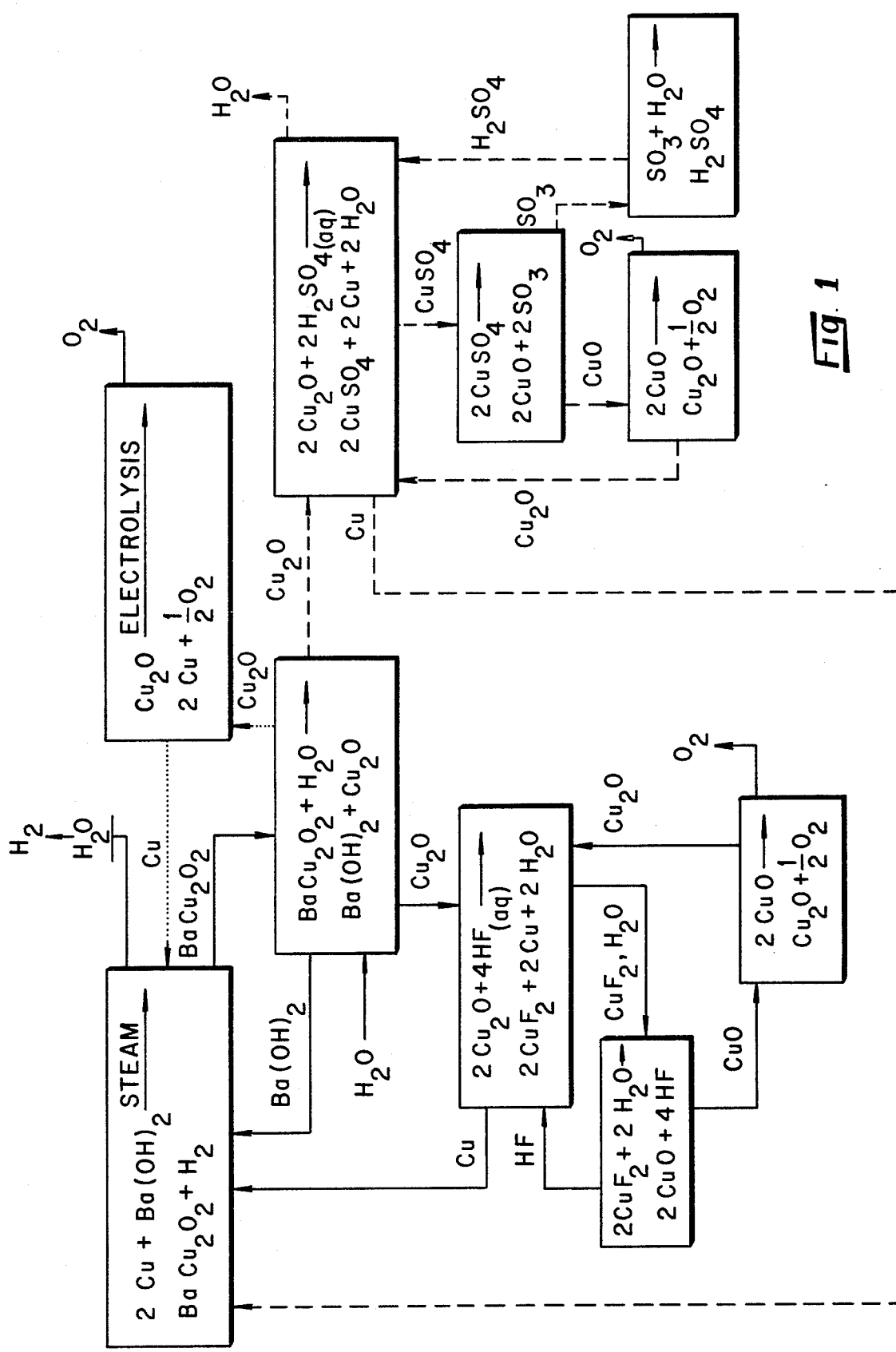
FIG. 1 is a chemical reaction flowsheet depicting the sequence of reactions for three embodiments of the cyclic production of hydrogen according to the process of this invention.

The cyclic production of hydrogen according to the present invention proceeds according to FIG. 1. FIG. 1 illustrates two reaction steps common to each of the hydrogen production cycles and three alternative methods for regenerating the Cu reactant for the initial reaction. The first reaction is the reaction of metallic Cu with $Ba(OH)_2$ in the presence of steam to provide a $BaCu_2O_2$ reaction product and $H_2$. The reaction of Cu with $Ba(OH)_2$ is performed by contacting Cu, preferably in the form of powder or turnings, with $Ba(OH)_2$ in the presence of steam of temperature of 600–800° C. An $H_2O$ pressure of 1–10 atmospheres is suitable. The reaction should be carried out in copper equipment or equipment resistant to corrosion by $Ba(OH)_2$. The reaction can be easily carried out on a laboratory scale in a horizontal tube furnace. The $Ba(OH)_2$ is liquid at the reaction temperature and the copper readily reacts with the liquid to yield hydrogen as illustrated by reaction (1).

$$2\,Cu + Ba(OH)_2 \xrightarrow{steam} BaCu_2O_2 + H_2 \quad (1)$$

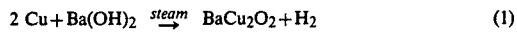

$H_2$ is carried out of the reaction zone with the steam and the steam is condensed from the gaseous phase, providing a gaseous $H_2$ product. Since Cu and $Ba(OH)_2$ are obtained upon treatment of the $BaCu_2O_2$ product in subsequent steps in the cycle, it is not necessary at this point to separate unreacted Cu and $Ba(OH)_2$ from the solid $BaCu_2O_2$-containing product.

In the second step in the cycle, the solid product of reaction (1) is reacted with $H_2O$ to provide $Ba(OH)_2$ and $Cu_2O$ according to the following reaction:

$$BaCu_2O_2 + H_2O \rightarrow Ba(OH)_2 + Cu_2O \quad (2)$$

This reaction is easily conducted by contacting the solid product of reaction (1) with water at about 25–100° C. at atmospheric pressure. Since the $Ba(OH)_2$ product is partially water soluble, the reaction and separation can be performed simultaneously by repeated boilings and filtration of the solid product of reaction (1), to provide a $Ba(OH)_2$ solution and a solid product containing $Cu_2O$. An inert atmosphere, e.g. $N_2$ or Ar, should be used to prevent formation of $BaCO_3$ from $CO_2$ present in air. In the laboratory, this reaction is easily conducted in a Soxhlet apparatus with the solid reactant on a glass frit and H₂O in the reservoir. The H₂O is heated to cause boiling or evaporation and subsequent condensation. The condensate contacts the solid reactant causing the formation of $Ba(OH)_2$ which dissolves in the excess condensed water. The $Ba(OH)_2$ solution is evaporated and the solid $Ba(OH)_2$ is recycled to reaction (1). Since the Cu-BaO-steam system is essentially equivalent to the Cu-Ba(OH)₂-steam system, it will be apparent that BaO can be used in reaction (1) instead of $Ba(OH)_2$. If BaO is to be recycled, the $Ba(OH)_2$ product of reaction (2) can be heated, e.g. to 900° C., to decompose the $Ba(OH)_2$ to BaO prior to recycle.

Cu can be recovered from the $Cu_2O$ product of reaction (2) in several ways. In one embodiment (represented by the solid lines in FIG. 1) $Cu_2O$ is reacted with aqueous HF solution according to the following reaction:

$$2Cu_2O + 4HF(aq) \rightarrow 2CuF_2 + 2Cu + 2H_2O \quad (3a)$$

This reaction can be performed by contacting $Cu_2O$ with an aqueous HF solution (15 to 48 wt.%) at a temperature of 25 to 80° C. The reaction goes essentially to completion. The reaction product mixture is an aqueous $CuF_2$ solution containing metallic copper which can be separated by filtration, sedimentation, etc. The separated Cu is recycled to reaction (1). To facilitate Cu separation, sufficient water should be present in the HF solution to maintain the $CuF_2$ product in solution. $CuF_2$ is recovered from solution by evaporation and the resulting $CuF_2$ powder is reacted with steam at temperatures of 250–500° C. by the following reaction:

$$CuF_2 + 2H_2O \rightarrow 2CuO + 4HF(g) \quad (4a)$$

This reaction is conducted by passing excess steam either over or through the $CuF_2$ powder. The H₂O pressure is not critical, with 1–10 atm. being suitable. The reaction proceeds essentially to completion. HF is recovered from the reaction mixture by condensing the gaseous product containing excess steam to provide an aqueous HF solution. The aqeuous HF solution is adjusted to the appropriate concentration for recycle to reaction (3a). CuO which remains as a solid product, is thermally decomposed according to the following reaction:

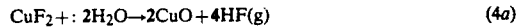
$$2CuO \xrightarrow{steam} 2Cu_2O + \tfrac{1}{2}O_2 \quad (5a)$$

This reaction is carried out by heating the solid product of reaction (4a) to about 950 to 1050° C. in the presence of steam. The preferred H₂O pressure is about 1 atm. The presence of steam significantly lowers the reaction temperature and produces $Cu_2O$ particles rather than a frozen liquid. Excess H₂O can be condensed from the reaction atmosphere leaving a gaseous O₂ product. The solid $Cu_2O$ is recycled to reaction (3a) for treatment with HF.

In a second embodiment (represented by dashed lines in FIG. 1) $Cu_2O$ from reaction 2 is reacted with aqueous sulfuric acid according to the following reaction:

$$2Cu_2O + 2H_2SO_4(aq) \rightarrow 2CuSO_4 + 2Cu + 2H_2O \quad (3f)$$

This reaction is carried out by contacting the solid product of reaction (2) with aqueous H₂SO₄ solution (about 20 to 60 wt.%) at a temperature of 25 to 80° C. The reaction goes essentially to completion. The $CuSO_4$ product is recovered in the form of an aqueous solution. The Cu precipitates and can be separated by filtration, sedimentation, etc. for recycle to reaction (1). The H₂SO₄ solution should contain sufficient H₂O to keep the resulting $CuSO_4$ in solution thereby facilitating recovery of Cu precipitate. The $CuSO_4$ product is recovered from solution by evaporation and thermally decomposed to CuO by heating to 600–900° C., according to the following reaction:

$$2CuSO_4 \rightarrow 2CuO + 2SO_3 \quad (4b)$$

to yield CuO and SO₃. The reaction can be conducted in air and SO₃ can be recovered from the reaction mixture by passage through an aqueous solution. The CuO product is decomposed by heating at from 950° to 1050° C. in steam atmosphere at about 1 atmosphere H₂O pressure according to reaction (5a) described earlier. The $Cu_2O$ product is recycled to reaction (3b). The SO₃ product of reaction (4b) is dissolved in water to provide H₂SO₄ solution by the following reaction:

$$SO_3 + H_2O \rightarrow H_2SO_4 \quad (5b)$$

The H₂SO₄ is recycled to reaction (3b). The preferred method of recovering SO₃ is to bubble the gaseous product through a concentrated H₂SO₄ solution, e.g. 37 M, to form oleum, which can then be diluted with water to the appropriate concentration for reaction (3b).

In a third embodiment (represented by dotted lines in FIG. 1) Cu is recovered from the $Cu_2O$ product of reaction (2) by electrolysis accoridng to the following reaction:

$$Cu_2O \xrightarrow{electrolysis} 2Cu + \tfrac{1}{2}O_2 \quad (3c)$$

The electrical energy necessary for this step is about 60% less than that required for direct electrolysis of water. The electrolysis can be performed in molten $Cu_2O$ or at a temperature below the $Cu_2O$ melting point in a molten salt solution. Suitable electrodes are a Cu cathode and an anode of a metal more noble than Cu, e.g. Pt, for evolving O₂. Those skilled in the art of electrochemistry can carry out the electrolysis according to the well-established principles for carrying out electrolysis from melts, such as those described for molten salt mixtures and molten salt mixtures containing dissolved Al₂O₃ in Potter, *Electrochemistry, Prinicples and Applications,* Cleaver-Hume Press Ltd., London, (1956) pp. 316–327, which is incorporated herein by reference.

The following examples demonstrate several of the reactions of the present invention.

EXAMPLE I

Reaction 1 was carried out in a copper boat or in a single crystal MgO crucible positioned in a silica tube within a horizontal furance. The boat contained 1.6 grams Cu turnings and 5 grams $Ba(OH)_2$. Steam at 500 ml water per hour was preheated and introduced into the reactor. The steam was mixed with argon at about 100 cc/min. to facilitate subsequent H₂ analysis of the product gas stream. The exiting gases were passed through a water-cooled condenser followed by a drying column and a hydrogen monitoring assembly. Upon heatup the $Ba(OH)_2$ melted. The evolution of hydrogen started at about 875° K. (602° C.) and reached a maximum at about 1070± 20° K. The reaction product, $BaCu_2O_2$, was recovered from the boat and identified by x-ray diffraction and chemical analysis. In the absence of steam the yield of hydrogen was about 18% while in the presence of steam the yield of hydrogen was about 100% based upon the oxidation to $Cu^+$. Stem prevents the decomposition of $Ba(OH)_2$ and thereby provides the source for $H_2$ production.

EXAMPLE II

The solid product of Example I was reacted with $H_2O$ in a Soxhlet extractor at about 345° K. $H_2O$ in the reservoir of the apparatus was evaporated and condensed over the solid $BaCu_2O_2$ whereupon the $Ba(OH)_2$ was formed and dissolved. The resulting $Ba(OH)_2$ solution was collected in the reservoir. After reacted ceased, the residue remaining was identified as $Cu_2O$.

EXAMPLE III

A known amount of $Cu_2O$ was dissolved in an aqueous HF solution (about 20 wt.%) in a polytetrafluoroethylene beaker with magnetic stirring. After about 30 minutes, finely divided Cu was separated by filtration from the blue $CuF_2$ solution. The yield of Cu was 86% of the stoichiometric amount.

EXAMPLE IV

The reaction of $CuF_2$ and $H_2O$ is performed by heating the $CuF_2$ powder in a HF-resistant container, i.e. polytetrafluoroethylene in a steam atmosphere (about 1 atm. pressure) at a temperature of about 250° C. HF solution is recovered as a condensate, leaving a solid CuO product. The recovered HF solution is adjusted to the appropriate concentration for use in reaction (3a).

EXAMPLE V

CuO was heated in a stream of steam containing argon. About 100% of the oxygen produced according to reaction (5a) was evolved upon heating to 1000° C. Under similar conditions in argon atmosphere, only about 3-4% of the oxygen was evolved upon heating to 1000° C. and less than 65% had been evolved after heating to nearly 1200° C.

Figure 2:
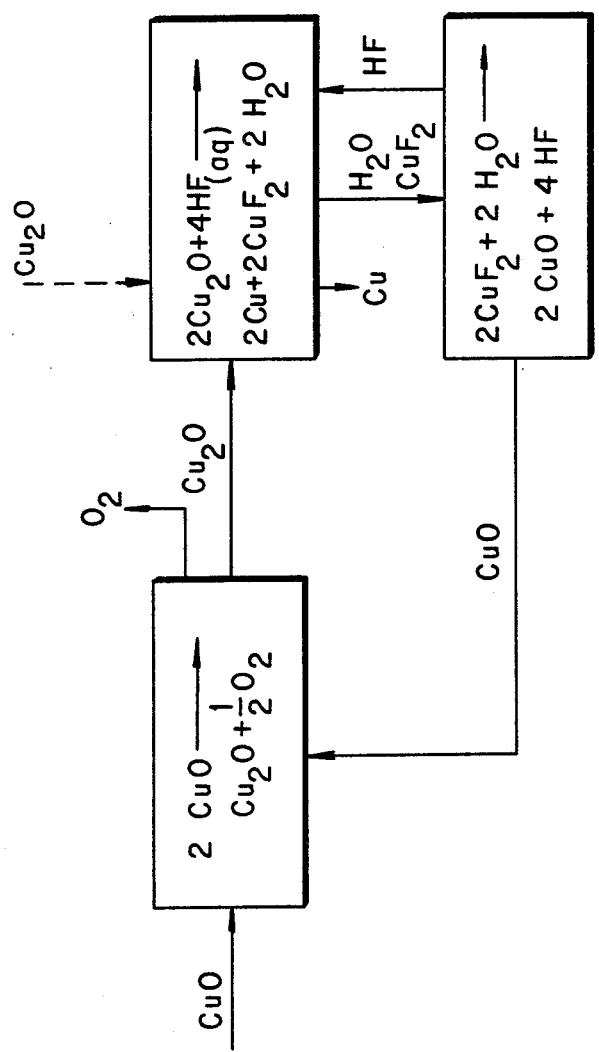
FIG. 2. is a chemical reaction flowsheet depicting the sequence of reaction for the recovery of Cu from CuO.

Another aspect of this invention is the recovery of Cu from CuO as illustrated in FIG. 2. The reactions are conducted in the same manner as described above. CuO, obtained for example from scrap material or naturally occurring ores such as tenorite and paramelaconite, is decomposed, preferably in the presence of steam according to reaction (5a). The CuO is heated at from 950-1050° C. in steam, e.g. at 1 atm. $H_2O$ pressure, to provide $Cu_2O$ and $O_2$. The solid $Cu_2O$ product is reacted according to reaction (3a) with aqueous 15-48 wt.% HF solution at 25-80° C. to provide a $CuF_2$ solution and a metallic Cu precipitate which is recoverable by filtration, sedimentation, etc. The HF solution should contain sufficient $H_2O$ to keep the resulting $CuF_2$ in solution, thereby facilitating recovery of Cu precipitate. The $CuF_2$ is recovered from solution by evaporation and reacted with steam at 250-500° C. according to reaction (4a) to provide solid CuO and gaseous HF. The HF is easily recovered from the gas phase by condensation into water to provide an HF solution. The HF concentration of the solution is adjusted for recycle to reaction and solid CuO is recycled to reaction (5a) for further treatment.

It can be seen that Cu can also be recovered from $Cu_2O$ such as naturally occurring cuprite ores by the same reaction cycle. Rather than adding CuO to reaction (5a), $Cu_2O$ is added to reaction (3a) as indicated by the dashed line in FIG. 2 and the sequence proceeds by reactions 3a, 4a, and 5a, respectively. By appropriate mass balance, mixtures of $Cu_2O$ and CuO can be processed according to FIG. 2.

It will be apparent to those skilled in the art that all separation in the processes of this invention need not be complete and all reagents need not be directly recycled. For example, fresh $H_2O$ can be added to any step where it is needed and can be allowed to escape as steam or used to provide heat for other portions of the process. Other products such as HF or $H_2SO_4$ may be diverted to other uses as economics might dictate, and be replaced with fresh material. These and other such obvious modifications are contemplated as equivalents of the processes described herein.

What is claimed is:

1. The process for producing hydrogen comprising the step of (a) reacting Cu with $Ba(OH)_2$ in the presence of steam to produce hydrogen and $BaCu_2O_2$.

2. The process of claim 1 further comprising reacting said $BaCu_2O_2$ with $H_2O$ to form $Ba(OH)_2$ and $Cu_2O$ and recycling said $Ba(OH)_2$ to said step (a).

3. The process of claim 2 further comprising
   (b) reacting said $Cu_2O$ with aqueous HF solution to provide $CuF_2$ and Cu,
   (c) reacting said $CuF_2$ with $H_2O$ to provide CuO and HF,
   (d) heating said CuO to sufficient temperature to form $Cu_2O$ and $O_2$,
   (e) recycling HF from step (c) to step (b),
   (f) recycling $Cu_2O$ from step (d) to step (b),
   (g) recycling Cu from step (b) to step (a).

4. The process of claim 3 wherein said step (d) is performed in the presence of steam.

5. The process of claim 2 further comprising
   (b) reacting said $Cu_2O$ with aqueous $H_2SO_4$ solution to provide $CuSO_4$ and Cu,
   (c) thermally decomposing said $CuSO_4$ to form CuO and $SO_3$,
   (d) heating said CuO to sufficient temperature to form $Cu_2O$ and $O_2$,
   (e) reacting $SO_3$ from step (c) with $H_2O$ to form $H_2SO_4$,
   (f) recycling $H_2SO_4$ from step (e) to step (b),
   (g) recycling $Cu_2O$ from step (d) to step (b),
   (h) recycling Cu from step (b) to step (a).

6. The process of claim 5 wherein said step (d) is performed in the presence of steam.

7. The process of claim 2 further comprising decomposing said $Cu_2O$ electrolytically to Cu and $O_2$ and recycling the resulting Cu to step (a).

* * * * *